(12) United States Patent
Reid

(10) Patent No.: US 12,338,864 B1
(45) Date of Patent: Jun. 24, 2025

(54) DIRECT FIT AUTOMOTIVE BRAKES

(71) Applicant: COVENANT HARBOR LIGHTS HOLDINGS, LLC, Elma, NY (US)

(72) Inventor: Thomas Reid, Elma, NY (US)

( * ) Notice: Subject to any disclaimer, the term of this patent is extended or adjusted under 35 U.S.C. 154(b) by 340 days.

(21) Appl. No.: 18/060,568

(22) Filed: Nov. 30, 2022

Related U.S. Application Data

(60) Provisional application No. 63/264,706, filed on Nov. 30, 2021.

(51) Int. Cl.
*F16D 55/00* (2006.01)
*F16D 55/228* (2006.01)
*F16D 121/02* (2012.01)

(52) U.S. Cl.
CPC .... *F16D 55/228* (2013.01); *F16D 2055/0091* (2013.01); *F16D 2121/02* (2013.01); *F16D 2200/003* (2013.01)

(58) Field of Classification Search
CPC ........... F16D 55/228; F16D 2055/0091; F16D 2121/02; F16D 2200/003
USPC ............. 188/73.1, 73.2, 73.39, 73.41–73.47; D12/180
See application file for complete search history.

(56) References Cited

U.S. PATENT DOCUMENTS

| | | | |
|---|---|---|---|
| 7,438,161 B2 * | 10/2008 | Burgoon | F16D 65/0043 188/73.32 |
| D864,809 S * | 10/2019 | Puddu | D12/180 |
| 10,677,299 B2 * | 6/2020 | Kelvin | F16D 65/0087 |
| 10,911,529 B2 * | 2/2021 | Miller | H04L 67/1031 |
| D953,222 S * | 5/2022 | Hong | D12/180 |

* cited by examiner

*Primary Examiner* — Christopher P Schwartz
(74) *Attorney, Agent, or Firm* — Mertzlufft Law PLLC; Joshua D. Mertzlufft

(57) ABSTRACT

A automotive brake system may include a caliper body and first and second spring pins. The caliper body may fit directly within a stock wheel of a vehicle and onto a stock knuckle of the vehicle. The caliper body may include a first section including a first socket, a second section including a second socket and connected to the first section, and an internal crossover passage. The internal crossover passage may be disposed partially within the first section and partially within the second section, may substantially contain a fluid between the sections, and may vent overpressure. The first spring pin may have a first end insertably disposed within the first socket. The second spring pin may have a second end insertably disposed within the second socket. The first spring pin and the second spring pin may be longitudinally collinear and receive a slide groove of a brake pad.

18 Claims, 7 Drawing Sheets

DIRECT FIT AUTOMOTIVE BRAKES

CROSS REFERENCE TO RELATED APPLICATIONS

This application claims priority to U.S. Provisional Application No. 63/264,706, filed on 30 Nov. 2021, the entire disclosure of which is hereby incorporated by reference.

BACKGROUND

Brakes may be implemented in a vehicle and used to slow down motion of the vehicle. Varying forms of braking system may be implemented, including friction brakes. Friction brakes in vehicles generally operate on the principle of pressing a non-rotating surface (e.g., a brake pad) against a rotating surface (e.g., a rotor).

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

In some aspects, the techniques described herein relate to an automotive brake system, including: a plurality of brake pads, each brake pad having an inner pad radius equal to or greater than the inner rotor radius of a brake rotor of a vehicle and an outer pad radius greater than the inner pad radius and equal to or less than the outer rotor radius of the brake rotor such that the brake pad is configured to apply a vehicle-specific friction braking force against a portion of a sector of a surface of the brake rotor; a plurality of pistons, each piston configured to apply a braking pressure to one of the brake pads sufficient to develop the vehicle-specific friction braking force; and a caliper, including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; an internal crossover passage disposed partially within the first section and partially within the second section, the internal crossover passage configured to substantially contain a fluid between the first section and the second section, wherein the internal crossover passage is configured to vent at an internal pressure exceeding a vent pressure; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad; and wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

In some aspects, the techniques described herein relate to a method of making an automotive brake system, the method including: receiving braking parameters for a vehicle, the braking parameters including an inner rotor radius of a brake rotor of the vehicle, an outer rotor radius of the brake rotor, and a vehicle-specific friction braking force; generating brake pad design parameters for a brake pad, each brake pad having an inner pad radius equal to or greater than the inner rotor radius and an outer pad radius greater than the inner pad radius and equal to or less than the outer rotor radius such that the brake pad is configured to apply the friction braking force against a portion of a sector of a surface of the brake rotor; generating piston design parameters for a piston, the piston configured to apply a braking pressure to the brake pad sufficient to develop the vehicle-specific friction braking force; generating caliper design parameters for a caliper, the caliper including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad; and wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

BRIEF DESCRIPTION OF THE FIGURES

For a fuller understanding of the nature and objects of the disclosure, reference should be made to the following detailed description taken in conjunction with the accompanying drawings, in which.

DETAILED DESCRIPTION

Figure 1:
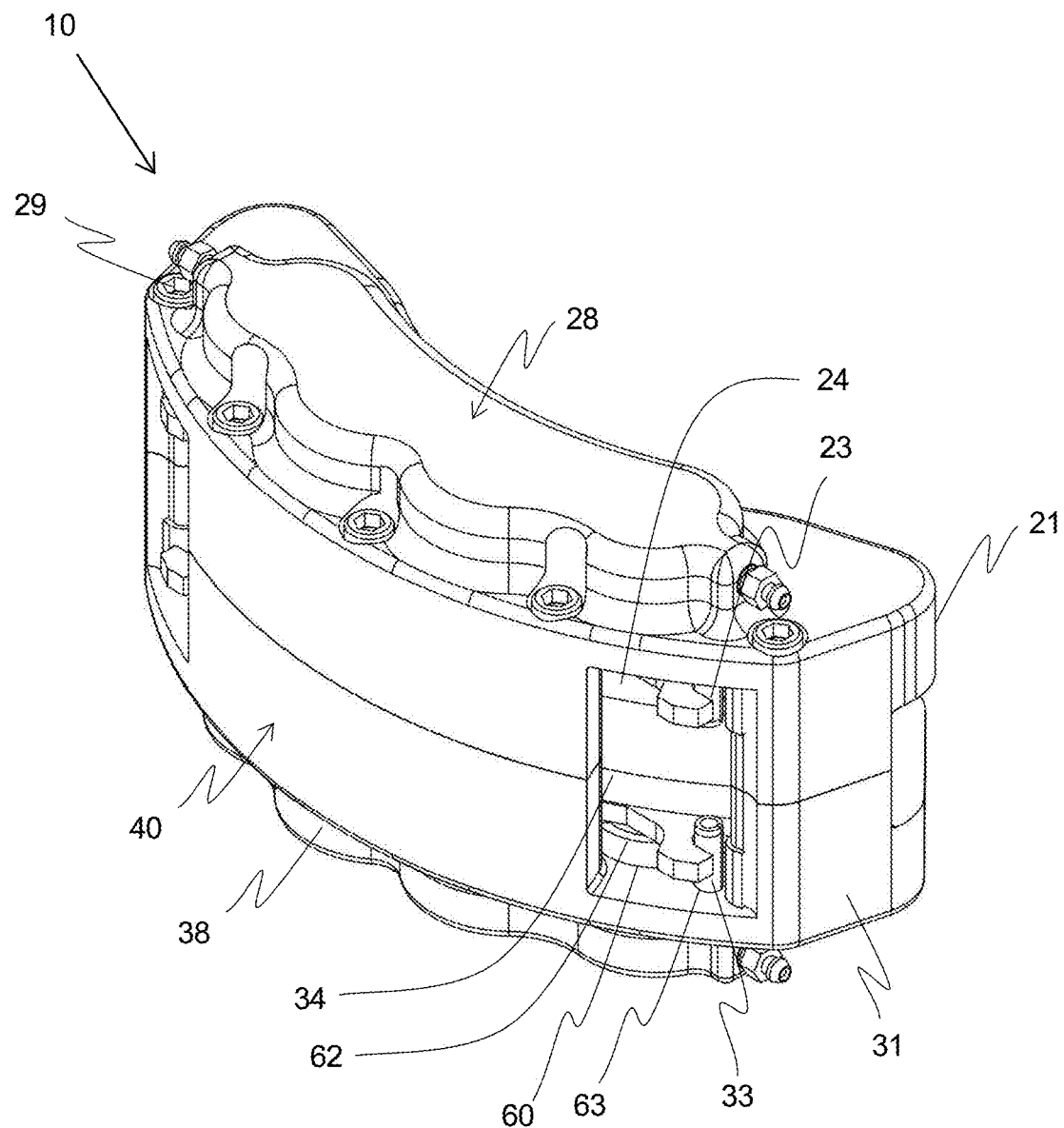
FIG. 1 illustrates an isometric view of an automotive brake caliper system, according to an embodiment.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Conventional automotive braking systems may include a brake pedal for transmitting a braking force from the vehicle operator to the wheels of the vehicle. The brake pedal may be operatively coupled to a brake booster via a push rod. The brake booster may be operatively connected to a master cylinder, and the master cylinder may be in fluid communication with a piston cylinder of a caliper via brake lines. The caliper may be mounted on, for example, the spindle, axle, or knuckle and may be selectively couplable to a wheel to develop friction between the rotor and the brake pads the vehicle via brake pads pressed by a piston. A piston disposed at least partially within the piston cylinder may be driven by the hydraulic fluid stored in the master cylinder as the brake pedal is depressed. When the piston is driven outward from the piston cylinder, it may press a non-rotating brake pad toward a rotating rotor, the friction between which may cause the rotational motion of the wheel to decelerate. As the piston exerts greater force on the brake pad, the friction between the brake pad and rotor increase, and thus the deceleration of the rotational motion of the wheel is increased.

Conventional braking systems may employ caliper-based systems to generate stopping force for the vehicles on which they are installed. The conventional braking systems involve an application of pressure to a rotor mounted to a wheel via a brake pad operated on by one or more pistons within the caliper. Such calipers and/or brake pads may be a standard size and may not apply sufficient force or have sufficient longevity, or durability in use. The conventional stock brake calipers may lack sufficient deliverable braking power or durability due to, for example, being undersized, having not enough pistons, having an uneven distribution of force across the brake pad via its pistons, or may have pistons that are too small for the desired stopping power.

Conventional aftermarket calipers may be used in place of stock calipers and/or braking systems. Such aftermarket calipers, while they may provide for increased braking power, may lack an ability to directly fit to a stock knuckle and around a stock rotor and remain within an inner dimension of a stock wheel. The lack of ability for conventional aftermarket brake calipers to fit directly within a stock wheel and onto a stock knuckle may require the use of adapters or specialized mounting kits for installation. These additional components make installation more complex and provide for additional potential failure points when in use. For example, if an aftermarket caliper requires a mounting adapter to fit onto a stock knuckle, there may be a first bolted connection of the aftermarket caliper to the adapter and a second bolted connection from the adapter to the knuckle. That there are two bolted connections in series provides for additional points of potential failure, for instance due to vibrations induced as a result of opposition of the vehicle or of the braking system.

Furthermore, conventional aftermarket braking systems may utilize a conventional method of securing the brake to its operative location within the braking system. Such a system may conventionally include two slide pins. A first slide pin may be on one end of the brake caliper and a second slide pin may be on the other end of the brake caliper. In use, a brake pad may have receivers (e.g., through-holes) on its ends for these respective slide pins. The slide pins may restrict an installed brake pad's motion such that the brake pad may be limited to movement normal (i.e., perpendicular) to a face of the rotor, which the brake pad may translate into contact with. In this way, a conventional brake pad may be pressed (e.g., translated) by operation thereupon by a piston of the brake caliper. This restriction of motion may provide that a brake pad does not dislodge either in a released state, for example, when it is not applying pressure to the rotor, as well as when it is in an operational state, for example, when a brake pad is applying pressure to the rotor.

Conventional slide pins may extend from one side of a caliper to the other side of the caliper, thus extending across a thickness of the rotor at a radius (e.g., relative to the rotor's, wheel's, or axle's rotational axis) external to the rotor. This slide pin configuration, that is, where the slide pin bridges the sides of the caliper across the rotor, may provide for the installation of a brake pad on each side of the rotor using the same slide pin at the first end of the caliper and the same slide pin at the second end of the caliper. Such a conventional caliper may thus have two slide pins for guiding its brake pads and restricting their motions to that which is normal to a contact surface of the rotor, and substantially parallel to an axis of the wheel.

The presence of the slide pins at a radius greater than the radius of the rotor may require a caliper to be sized in such a way that it is larger than the rotor. Furthermore, that the slide pins bridge the sides of the caliper across the rotor may conventionally require removal of the slide pins to remove the brake pads from the caliper. The removal of the slide pins may require special tools as well as provide for an awkward positioning required to extract them from the caliper. In some conventional braking systems, the caliper itself must be disassembled for removal of slide pins and/or the brake pads. Slide pins which must be removed via extraction may, after use or weathering exhibit effects (e.g., corrosion, mechanical binding, wear, thermal expansion, anodization, or other effects), which may cause the slide pins to bind or otherwise be stuck within the holes of the caliper through which they are inserted. Such binding may provide for difficult extraction of the spring pins, or in extreme cases, an inability to extract the slide pins.

Implementations as disclosed herein may solve some or all of the aforementioned problems. Automotive brake calipers and systems including them may include a caliper body and first and second spring pins. The caliper body may fit directly within a stock wheel of a vehicle and onto a stock knuckle of the vehicle. The caliper body may include a first section including a first socket, a second section including a second socket and connected to the first section, and an internal crossover passage. The internal crossover passage may be disposed partially within the first section and partially within the second section, may substantially contain a fluid between the sections, and may vent overpressure. The first spring pin may have a first end insertably disposed within the first socket. The second spring pin may have a second end insertably disposed within the second socket. The first spring pin and the second spring pin may be longitudinally collinear and receive a slide groove of a brake pad.

As used herein, the term "stock," when modifying a name of a part, component, or other element, may refer to the part, component, or other element being unmodified or an in-kind replacement of that which the vehicle was manufactured with (e.g., the part, component, or element may be described as being an "original equipment manufacturer," or OEM, part).

An automotive brake caliper may have a first side (e.g., section) and a second side (e.g., section). Each side may have one or more pistons. In one example, each side may have three pistons, thus providing for a six piston caliper. In another example, each side may have four pistons, thus providing for an eight piston caliper. The number of pistons may be determined based on, for example, stopping power requirements, the size of the vehicle, the balance of the braking system, or other factors. The pistons may be in fluid communication with a hydraulic braking system. It should be understood that embodiments are not limited to hydraulic braking systems, but embodiments may also include pneumatic systems and/or electric braking systems. The calipers may have cavities configured to distribute a fluid to each piston contained therein as well as to distribute fluid across the caliper from one side to the other side, for example, via an internal crossover passage. The calipers may comprise, for example, a metal (e.g., steel, stainless steel, aluminum, titanium, or other metals, or various alloys thereof, which may include one or more other materials), a plastic (e.g., ABS, polylactic acid (PLA), polycarbonate (PG), polyethylene terephthalate (PET, PETT, PETG, PETE), nylon, high density polyethylene (HDPE), polyvinyl chloride (PVC), low density polyethylene (LDPE), polypropylene (PP), or polystyrene, or other suitable plastics), a composite material (e.g., carbon fiber), and/or combinations thereof. In some embodiments, the calipers may include a caliper body comprising billet aluminum, which may be machined to the design of the caliper body.

An inlet for fluid into the caliper may be disposed on, and through, an external surface of one side of the caliper. To provide for a connection to the hydraulic system, a threaded hole may be provided for attachment to, for example, a fluid hose. The threaded connection may be disposed within a boss disposed on the outer surface of the caliper side. The boss may provide for additional material wall thickness for the threaded connection, thus providing for a more robust and durable threaded connection between the hydraulic hose and the caliper.

Each piston may include a piston cavity disposed within a caliper side and a movable piston disposed within the piston cavity. The piston cavity may have one or more channels circumscribed about its internal surface. Within the channel may be disposed a gasket (e.g., a Buna N gasket, an NBR gasket, a metal gasket, etc.), which may prevent fluid from escaping around the piston between the piston and the piston cavity. In an exemplary embodiment, there may be two channels circumscribed about an internal surface of each piston cavity. This dual-gasketed configuration of each piston may provide for greater resistance to hydraulic fluid leakage and enable operation at higher pressures compared to pistons employing one gasket. A dual-gasketed configuration may further provide for additional resistance to external particle penetration into the hydraulic fluid system via the gap between the piston and the piston cavity.

An automotive brake caliper may further, due to its structural integrity and design, be directly mounted to a stock knuckle. The ability to mount an embodiment automotive brake caliper to the stock knuckle within a stock wheel may thus eliminate a need for an adapter to connect the caliper to the knuckle. Accordingly, there may be fewer parts, increasing system elegance and reducing opportunities for braking system failure.

Embodiment automotive brake calipers may implement spring pins for limiting the motion of brake pads to translations normal to a surface of a rotor. The spring pins may be installed, for example, by compressing (e.g., squeezing) the spring pin so as to elastically shrink its diameter. With an elastically shrunk diameter, the spring pin may be inserted into a socket on the automotive brake caliper and, when the spring pin is in the proper location, the spring pin may be permitted to decompress and thus provide for a mechanical interference fit with the socket receiving the spring pin in the automotive brake caliper.

In an example, an automotive brake caliper may be configured with four spring pins. Two spring pins may be disposed at a first end of the caliper and two spring pins may be disposed at a second end of the caliper. Each spring pin may be disposed within a socket in a body of the caliper. In an example where the caliper body includes a first section and a second section, each pair of spring pins may include one spring pin disposed within a socket of the first section and a second spring pin disposed within a socket of the second section. Each pair of spring pins may be oriented (and the mounting holes of the caliper so located) such that when installed, the spring pins of the pair of spring pins may substantially share an axis. When installed, there may be a gap between exposed ends of each spring pin within each pair of spring pins. This gap may be sized such that one spring pin in a pair of spring pins may be extracted from the caliper without extracting the other spring pin of the pair. This thus provides for an ability to remove the spring pins of one side of the automotive brake caliper, for example, for maintenance on the brake pad of the one side of the caliper without needing to remove or displace the other brake pad. Furthermore, the use of spring pins may lessen detrimental effects of corrosion and mechanical wear, as the spring pins may not rely upon only an ability to slide out of the hole within which they are mounted on the caliper. As such, each spring pin may be able to be independently extracted by compressing (e.g., squeezing) it such that its diameter is shrunk, and the interference fit ceased. In this way, each spring pin may be easily extracted from the caliper.

Furthermore, the use of spring pins having a gap therebetween may permit a smaller outer radius dimension of the automotive brake caliper. Thus, the caliper may be of a smaller design envelope and not require additional material between the outer radius of the rotor and the inner radius of the wheel beyond that which is required for structural integrity of the caliper and/or crossover of fluid from one side of the caliper to the other. The caliper, while configured to perform functions of a braking system, may thus be installed aftermarket within a stock wheel.

Further, use of pairs of spring pins having a gap therebetween may permit the automotive brake caliper to have a circular arc shape, thereby further reducing a portion of its profile between the rotor's outer radius and the wheel's inner radius. Because of this, the automotive brake caliper may be installed within a wheel of a smaller inner radius than that which would be required if conventional slide pins were used and needed to extend between the outer radius of the rotor and the inner radius of the wheel.

The automotive brake caliper may further have an internal crossover passage for transmitting hydraulic fluid from one side of the caliper to the other. This internal crossover passage may be disposed within the body of the caliper. By its disposition within the body of the caliper, the internal crossover passage may be shielded from (e.g., not exposed to) external wear factors or potentially-damaging effects. The internal crossover passage may include an ability to vent overpressure integrated into its design. This may be embodied by an internal crossover passage having an integral pressure relief valve disposed therein. This integral pressure relief valve may be, for example, a gasketed connection between a first side and a second side of the caliper. The pressure relief valve may be configured such that when a pressure (e.g., a rated burst pressure of the gasket joint) is exceeded, pressure may vent to return the fluid within the internal crossover passage to an operating pressure or a safe pressure, for example, a safe operating pressure. In this way, pressure relief within the internal crossover passage may provide for designed pressure relief and/or a designed failure point, which may be safe and prevent damage or a breakdown of operation of the braking system. Thus, even after a safe operating pressure is exceeded within the braking system, the braking system may remain operational fully or at least in a limited manner. This improvement over conventional systems may allow a vehicle to be moved (e.g., driven) to a location at which the braking system may be inspected or repaired without fully eliminating a stopping power of the vehicle.

FIG. 1 illustrates an isometric view of an automotive brake caliper system 10, according to an embodiment. The brake caliper system 10 may also be referred to, inter alia, as a "brake caliper," a "brake caliper system," a "brake system," "an "automotive brake caliper," or a "system." The brake caliper system 10 may be configured to accept a brake rotor between brake pads 24 and 34. The brake caliper system 10 may be configured to press the brake pads 24 and 34 against a rotating rotor. Generated friction between the brake pads 24 and 34 and the rotor may cause the rotational motion of the rotor to slow and/or stop.

The automotive brake caliper system 10 may include a first section 21 and a second section 31, which may be connected to one another via one or more attachment features 29 (e.g., bolts, screws, pins, etc.). The first section 21 of the caliper system 10 may extend in a curvature from a first end of the first section 21 to a second end of the section and be configured to accept a brake pad 24 and a portion of a rotor therein. The first section 21 may have a first piston housing 28. The second section 31 of the caliper system 10 may extend in a curvature from a first end of the section to a second end of the second section 31 and be configured to accept a brake pad 34 and a portion of a rotor therein. The second section 31 may have a second piston housing 38. The piston housings 28 and 38 may be configured to house therein fluid passages associated with the crossover housing 40 and piston cavities (e.g., a piston cavity 60) configured to operate on pistons (e.g., a piston 62) to push the brake pads 24 and 34 toward the rotor. The attachment features 29 may include, for example, bolts, screws, or pins configured to secure together the first section 21 and the second section 31. For example, five attachment features 29 are shown extending through the first section 21 to the second section 31. A first spring pin 23 may be disposed within a socket of the first section 21. A second spring pin 33 may be disposed within a socket of the second section 31. Such sockets may include, for example, a socket 63 as depicted in FIG. 1 having second spring pin 33 disposed partially therein.

Figure 2:
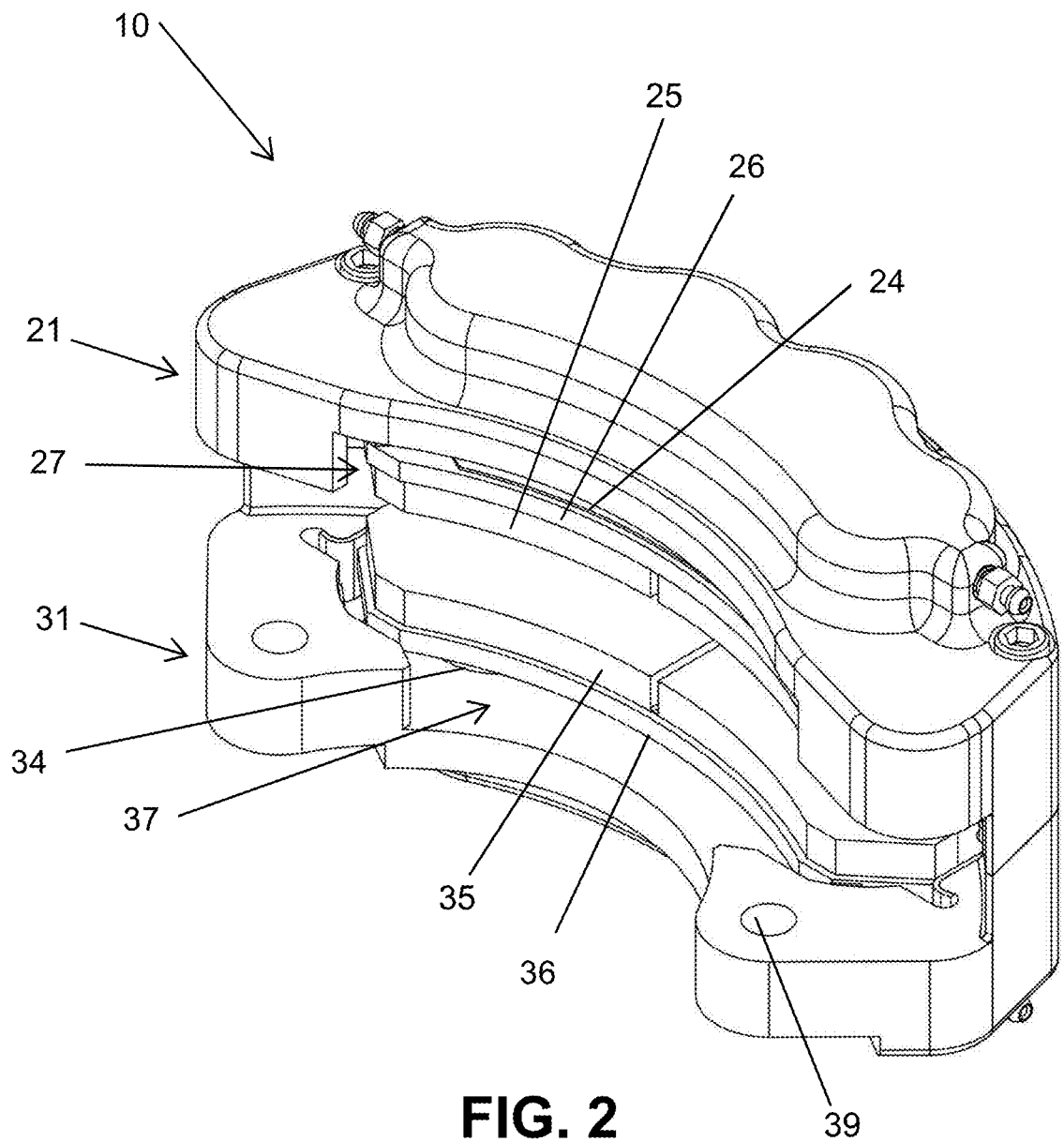
FIG. 2 illustrates a further isometric view of an automotive brake caliper system, according to an embodiment.

FIG. 2 illustrates a further isometric view of an automotive brake caliper system 10, according to an embodiment. FIG. 2 may illustrate an interior portion of the automotive brake caliper system 10.

The first section 21 of the automotive brake caliper system 10 may extend in a curvature from a first end of the first section 21 to a second end of the first section 21 and may receive a brake pad 24 and a rotor therein. The brake pad 24 may include a friction pad 25 and a backing plate 26. The second section 31 of the caliper system 10 may extend in a curvature from a first end of the second section 31 to a second end of the second section 31 and may receive a brake pad 34 and a rotor therein. The brake pad 34 may include a friction pad 35 and a backing plate 36. The two brake pads 25 and 35 may thus translate inwardly toward each other, and away from respective piston faces 27 and 37 to apply pressure to a rotor, and in turn generating friction to slow and/or stop the rotors, and thus the wheels, rotational motion.

One or more mounting holes 39 may be provided for mounting the automotive brake caliper system 10 to a knuckle of a wheel system. For example, the mounting holes 39 may be sized and spaced to provide for mounting of the automotive brake caliper system 10 to a stock knuckle. The mounting holes 39 may be configured to accept a threaded connection (e.g., a bolted connection) directly between the knuckle and the automotive brake caliper system 10.

Figure 3:
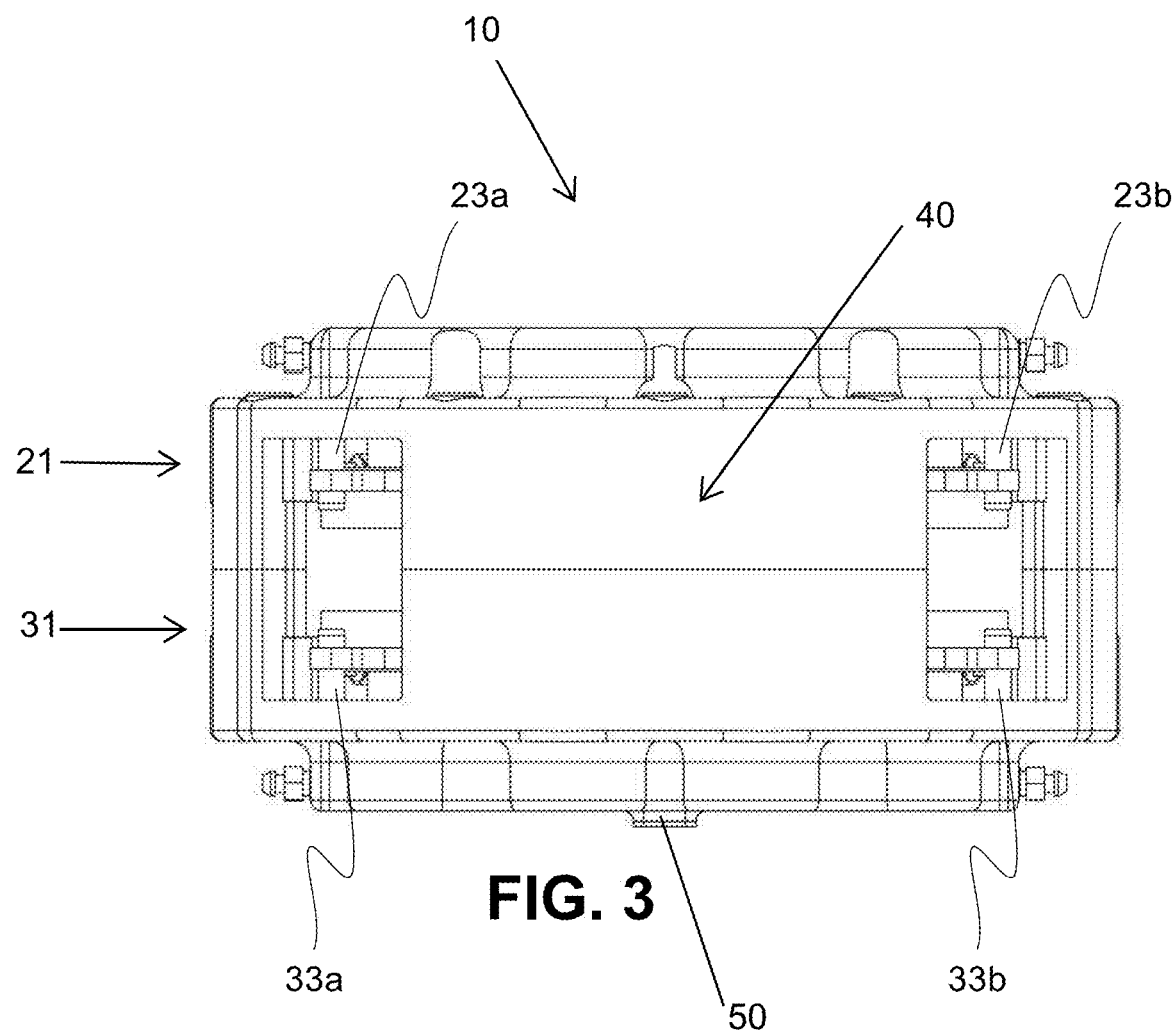
FIG. 3 illustrates a top view of an automotive brake caliper system, according to an embodiment.

FIG. 3 illustrates a top view of an automotive brake caliper system 10, according to an embodiment. The top view may provide for greater detail as to the layout of components within the automotive brake caliper system 10.

An inlet 50 may include a bossed, threaded connection (e.g., an NPT thread). The automotive brake caliper system 10 may have four spring pins 23a, 23b, 33a, and 33b. Two spring pins 23a and 33a may be disposed at a first end of the automotive brake caliper system 10 and two spring pins 23b and 33b may be disposed at a second end of the automotive brake caliper system 10. Each of the spring pins 23a, 23b, 33a, and 33b may be disposed within a socket in a body of the automotive brake caliper system 10. Two of the spring pins 23a and 23b may be disposed within sockets of the first section 21 and two of the spring pins 33a and 33b may be disposed within sockets of the second section 31. Thus, two pairs of spring pins may exist: a first pair of spring pins 23a and 33a proximate a first end of the automotive brake caliper system 10 and a second pair of spring pins 23b and 33b proximate a second end of the automotive brake caliper system 10.

One or more bleeders 30 may be disposed on the first section 21, each bleeder in fluid communication with the fluid distribution and transmission channels internal to the first section 21. The bleeders 30 may provide for a bleeding off of fluid from the automotive brake caliper system 10.

Figure 4:
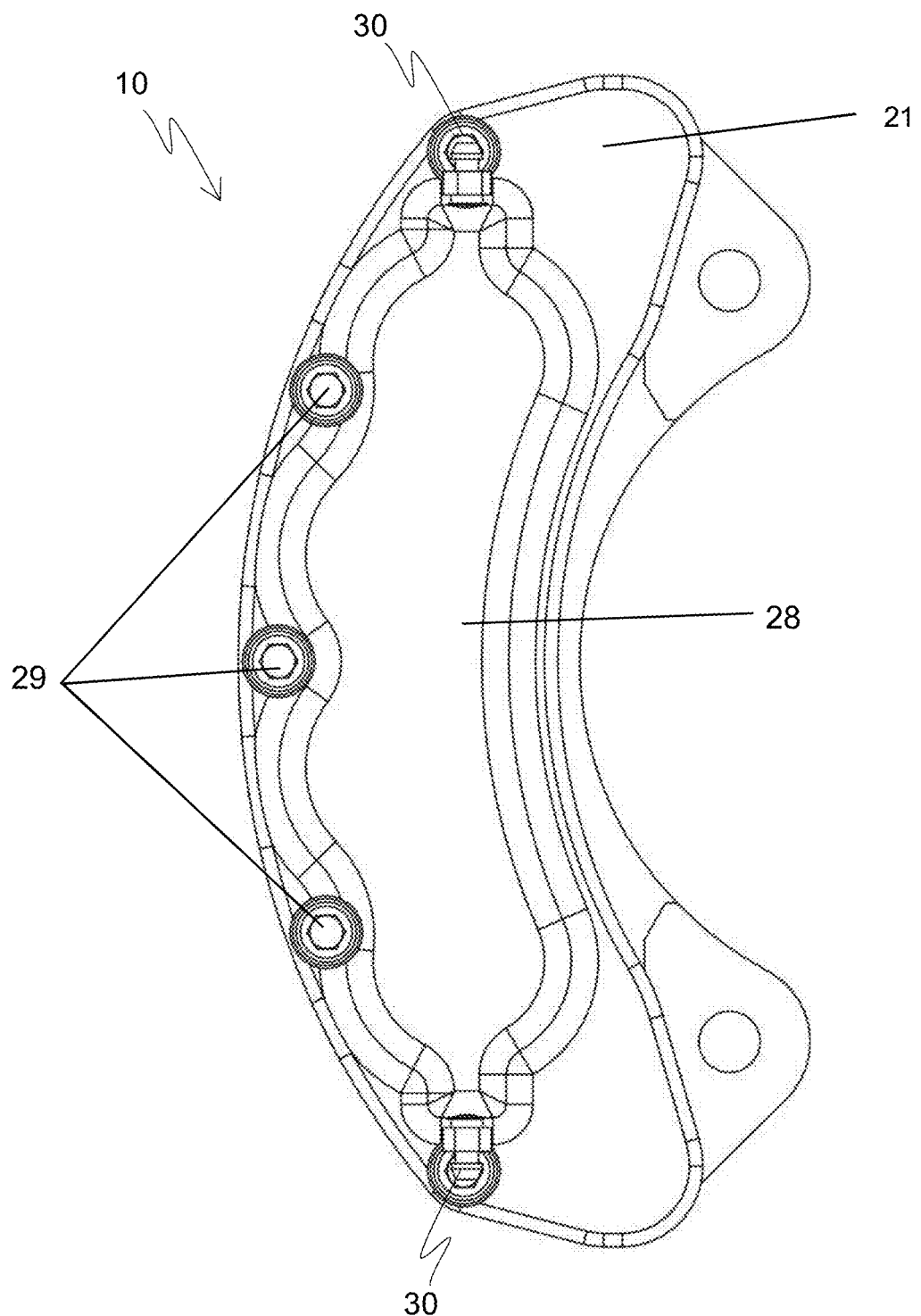
FIG. 4 illustrates a rear view of an automotive brake caliper system, according to an embodiment.

FIG. 4 illustrates a rear view of an automotive brake caliper system, according to an embodiment. As depicted in FIG. 4, one or more attachment features 29 may be used to secure the first section 21 to the second section 31. The first section 21 may include a piston housing 28 protruding therefrom configured to house the one or more piston cavities of the first section 21, as well as passages for the distribution and transmission of operating fluid to each of the piston cavities, as well as from an internal crossover passage.

Figure 5:
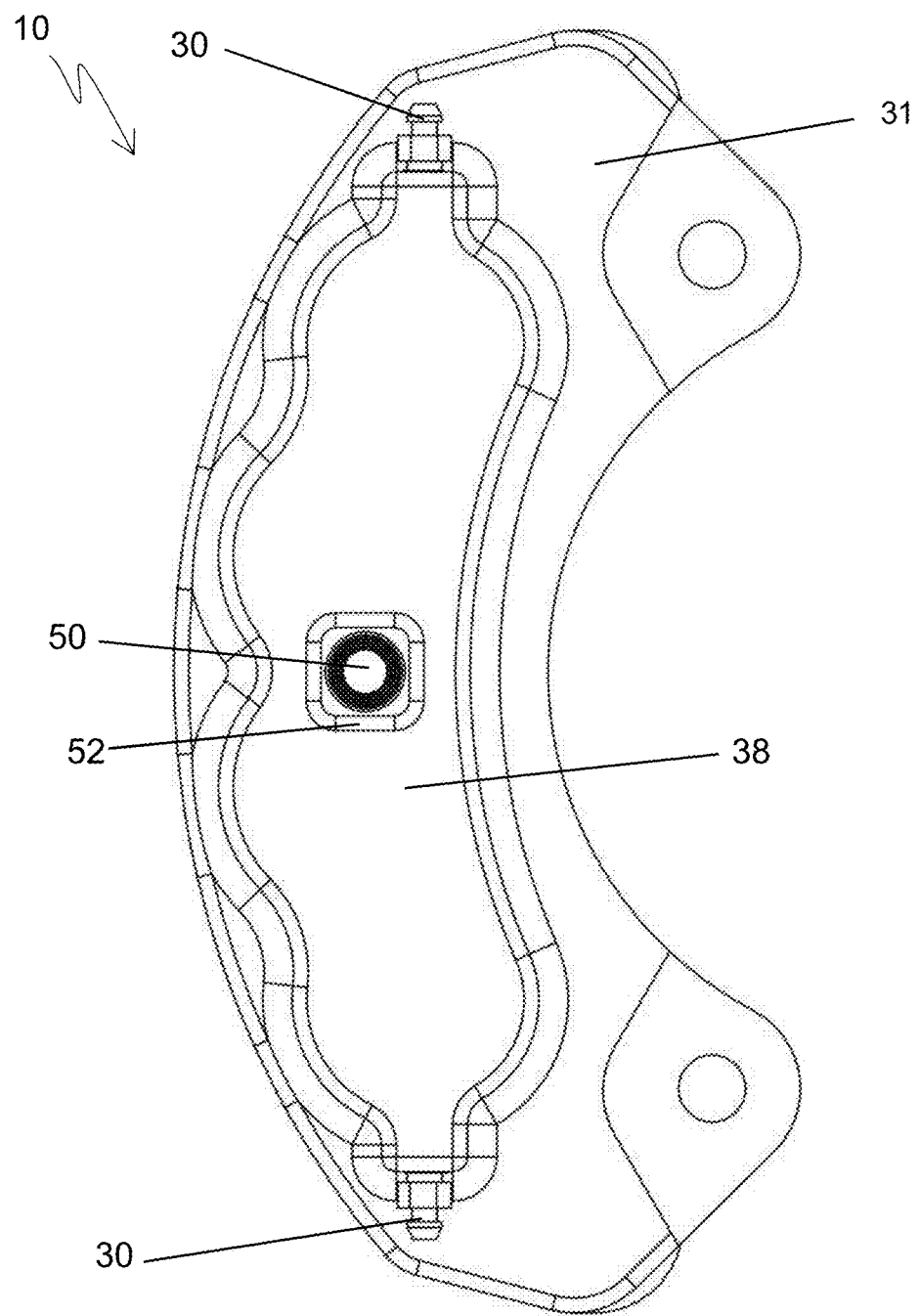
FIG. 5 illustrates a side view of an automotive brake caliper system, according to an embodiment.

FIG. 5 illustrates a side view of an automotive brake caliper system 10, according to an embodiment. The automotive brake caliper system 10 may include the second section 31, which may have a piston housing 38 similar to the piston housing 28. One or more bleeders 30 may be disposed on the second section 31, each bleeder in fluid communication with the fluid distribution and transmission channels internal to the second section 31.

The inlet 50 may include a bossed, threaded connection (e.g., an NPT thread). The bossed inlet 50 may have fillets configured to enhance a distribution of stresses within the material of the second section 31 away from the threaded connection of the inlet 50.

Figure 6:
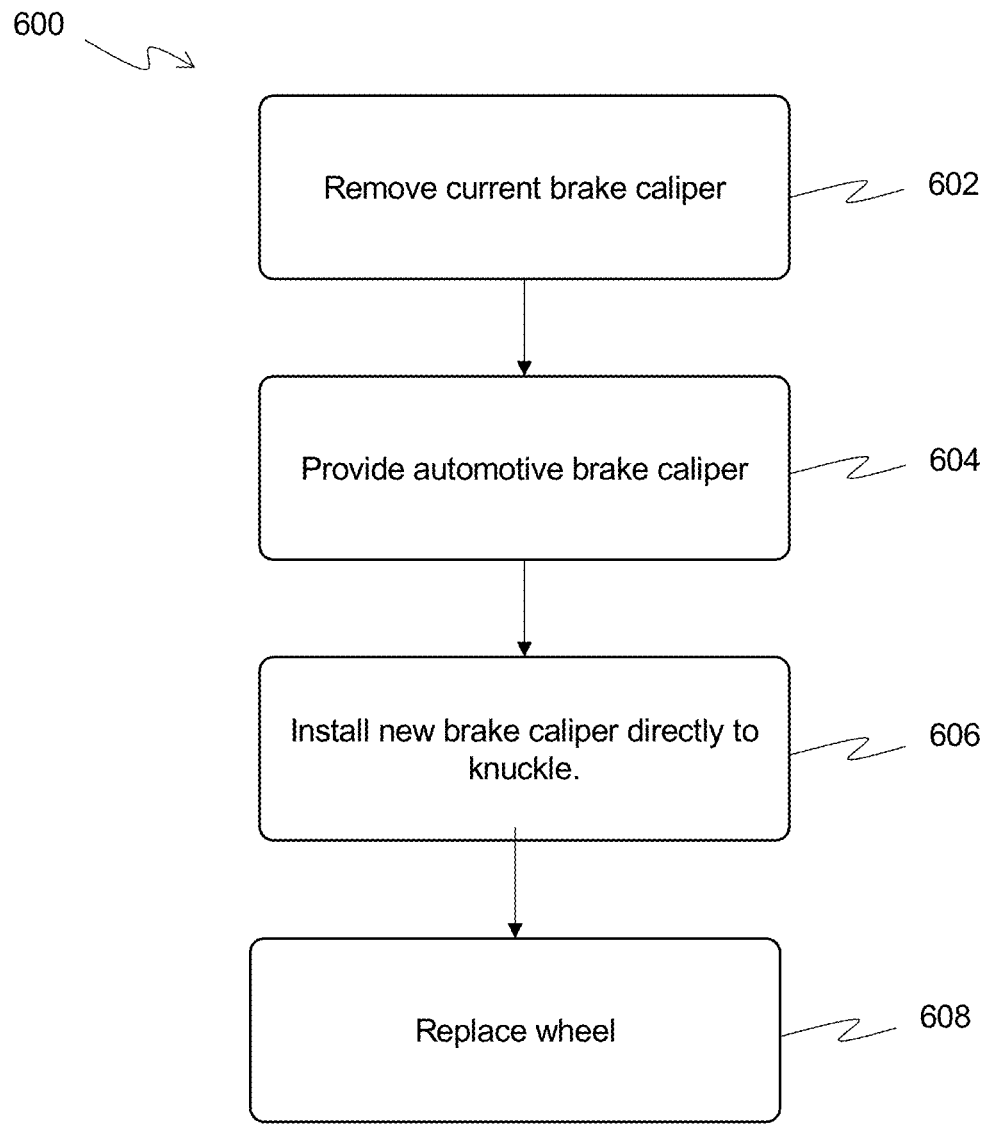
FIG. 6 illustrates a method of installing an automotive brake caliper system, according to an embodiment.

FIG. 6 illustrates a method 600 of installing an automotive brake caliper system, according to an embodiment. An automotive brake caliper system may be installed using the method 600, for example, to replace an existing brake caliper (e.g., a stock brake caliper). Further, the method 600 may provide for the installation of an automotive brake caliper system configured to directly fit a knuckle (e.g., a stock knuckle) of a wheel assembly and fit within a wheel (e.g., a stock wheel).

At 602, the current brake caliper (e.g., a stock brake caliper) may be removed from the knuckle of the wheel assembly. A wheel may be removed to provide for access to the current brake caliper. At 604, an automotive brake caliper system (e.g., similar to the automotive brake caliper system 10) may be provided. At 606, the automotive brake caliper system may be installed directly to the knuckle of the wheel assembly. At 608, the wheel may be replaced such that its internal surface is disposed over, and freely rotate over, an external surface of the automotive brake caliper system.

Figure 7:
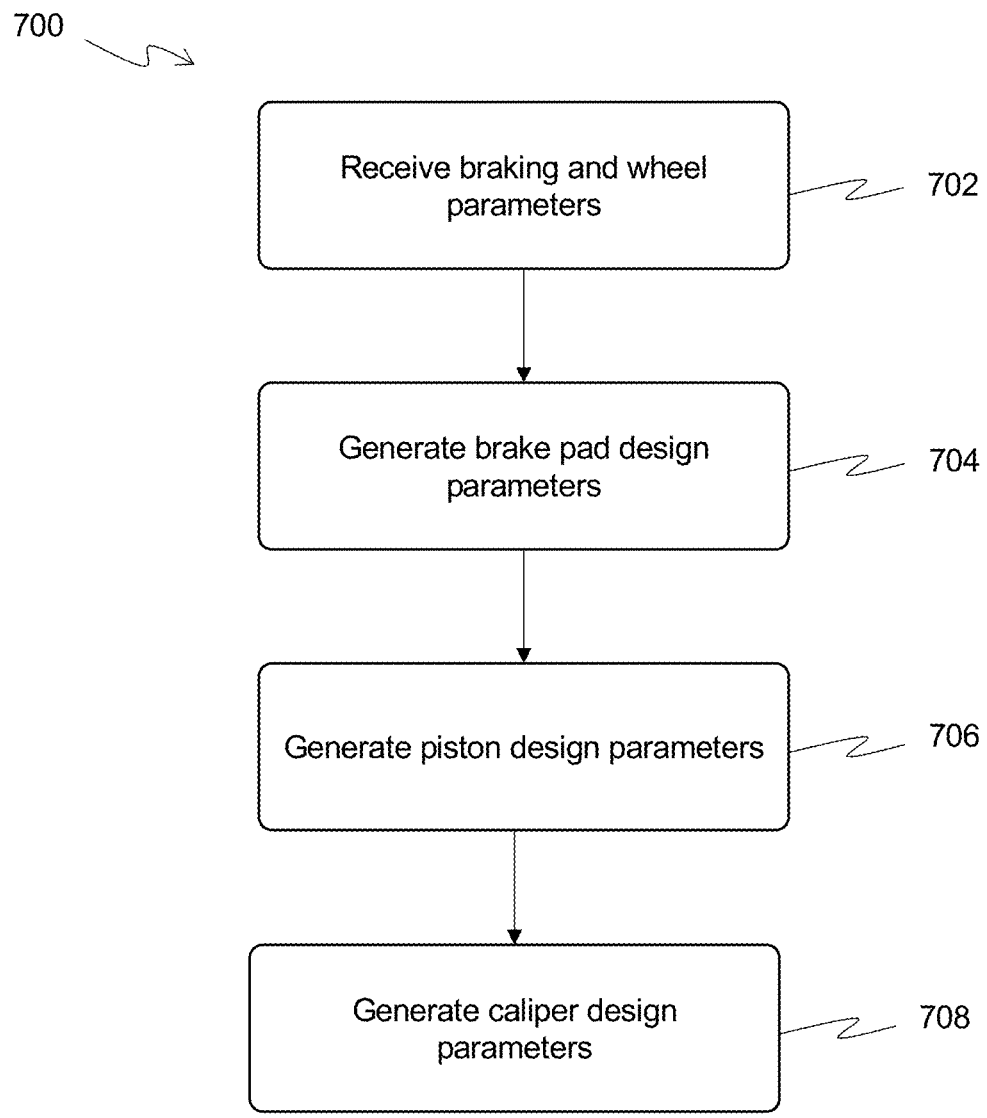
FIG. 7 illustrates a method of generating automotive braking system design parameters, according to an embodiment.

FIG. 7 illustrates a method 700 of generating automotive braking system design parameters, according to an embodiment. The method 700 may be used to generate a design of aftermarket automotive braking systems configured for direct fit onto a stock knuckle and within a stock wheel.

At 702, the method may include receiving braking parameters for a vehicle, the braking parameters including an inner rotor radius of a brake rotor of the vehicle, an outer rotor radius of the brake rotor, and a vehicle-specific friction braking force.

At 704, the method may include generating brake pad design parameters for a brake pad, each brake pad having an inner pad radius equal to or greater than the inner rotor radius and an outer pad radius greater than the inner pad radius and equal to or less than the outer rotor radius such that the brake pad is configured to apply the friction braking force against a portion of a sector of a surface of the brake rotor.

At 706, the method may include generating piston design parameters for a piston, the piston configured to apply a braking pressure to the brake pad sufficient to develop the vehicle-specific friction braking force.

At 708, the method may include generating caliper design parameters for a caliper, the caliper including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad; and wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

Clause 1. An automotive brake system, comprising: a plurality of brake pads, each brake pad having an inner pad radius equal to or greater than the inner rotor radius of a brake rotor of a vehicle and an outer pad radius greater than the inner pad radius and equal to or less than the outer rotor radius of the brake rotor such that the brake pad is configured to apply a vehicle-specific friction braking force against a portion of a sector of a surface of the brake rotor; a plurality of pistons, each piston configured to apply a braking pressure to one of the brake pads sufficient to develop the vehicle-specific friction braking force; and a caliper, including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; an internal crossover passage disposed partially within the first section and partially within the second section, the internal crossover passage configured to substantially contain a fluid between the first section and the second section, wherein the internal crossover passage is configured to vent at an internal pressure exceeding a vent pressure; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad; and wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

Clause 2. The automotive brake system of claim 1, further comprising a boss disposed on the caliper body, wherein the boss comprises an inlet connection in fluid communication with the internal crossover passage.

Clause 3. The automotive brake system of claim 1, wherein the first spring pin and the second spring pins are configured to form an interference fit with the first socket and the second socket, respectively.

Clause 4. The automotive brake system of claim 1, wherein the caliper body is configured to fit directly onto the stock knuckle of the vehicle via a bolted connection directly between the caliper body and the stock knuckle.

Clause 5. The automotive brake system of clause 1, wherein the caliper body comprises machined billet aluminum.

Clause 6. An automotive brake system, comprising: a plurality of brake pads, each brake pad having an inner pad radius equal to or greater than the inner rotor radius of a brake rotor of a vehicle and an outer pad radius greater than the inner pad radius and equal to or less than the outer rotor radius of the brake rotor such that the brake pad is configured to apply a vehicle-specific friction braking force against a portion of a sector of a surface of the brake rotor; a plurality of pistons, each piston configured to apply a braking pressure to one of the brake pads sufficient to develop the vehicle-specific friction braking force; and a caliper, including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad.

Clause 7. The automotive brake system of clause 6, wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

Clause 8. The automotive brake system of clause 6, wherein the caliper body further includes an internal crossover passage disposed partially within the first section and partially within the second section, the internal crossover passage configured to substantially contain a fluid between the first section and the second section, wherein the internal crossover passage is configured to vent at an internal pressure exceeding a vent pressure.

Clause 9. The automotive brake system of claim 6, further comprising a boss disposed on the caliper body, wherein the boss comprises an inlet connection in fluid communication with the internal crossover passage.

Clause 10. The automotive brake system of claim 6, wherein the first spring pin and the second spring pins are configured to form an interference fit with the first socket and the second socket, respectively.

Clause 11. The automotive brake system of claim 6, wherein the caliper body is configured to fit directly onto the stock knuckle of the vehicle via a bolted connection directly between the caliper body and the stock knuckle.

Clause 12. The automotive brake system of clause 6, wherein the caliper body comprises billet aluminum.

Clause 13. A method of making an automotive brake system, the method comprising: receiving braking parameters for a vehicle, the braking parameters including an inner rotor radius of a brake rotor of the vehicle, an outer rotor radius of the brake rotor, and a vehicle-specific friction braking force; generating brake pad design parameters for a brake pad, each brake pad having an inner pad radius equal to or greater than the inner rotor radius and an outer pad radius greater than the inner pad radius and equal to or less than the outer rotor radius such that the brake pad is configured to apply the friction braking force against a portion of a sector of a surface of the brake rotor; generating piston design parameters for a piston, the piston configured to apply a braking pressure to the brake pad sufficient to develop the vehicle-specific friction braking force; generating caliper design parameters for a caliper, the caliper including: a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes: a first section defined by one or more first piston cavities and a first socket; a second section connected to the first section, the second section defined by one or more second piston cavities and a second socket; wherein each of the first piston cavities and the second piston cavities are configured to receive a piston; and wherein the caliper body is configured to be attached to a stock knuckle of a vehicle; a first spring pin having a first end insertably disposed within the first socket; a second spring pin having a second end insertably disposed within the second socket; and wherein the first spring pin and the second spring pin are longitudinally collinear and configured to receive a slide groove of the brake pad; and wherein the brake pads, the pistons, the caliper, the first spring pin, and the second spring pin are configured for aftermarket installation on the vehicle by: removing an existing brake caliper; installing the caliper to the vehicle by attaching the caliper body to the stock knuckle; and installing the stock wheel over the caliper body.

Clause 14. The method of clause 13, wherein the caliper body further includes an internal crossover passage disposed partially within the first section and partially within the second section, the internal crossover passage configured to substantially contain a fluid between the first section and the second section, wherein the internal crossover passage is configured to vent at an internal pressure exceeding a vent pressure.

Clause 15. The method of clause 13, further comprising a boss disposed on the caliper body, wherein the boss comprises an inlet connection in fluid communication with the internal crossover passage.

Clause 16. The method of clause 13, wherein the first spring pin and the second spring pins are configured to form an interference fit with the first socket and the second socket, respectively.

Clause 17. The method of clause 13, wherein the caliper body is configured to fit directly onto the stock knuckle of the vehicle via a bolted connection directly between the caliper body and the stock knuckle.

Clause 18. The method of clause 13, wherein the caliper design parameters are configured for the caliper to be machined from billet aluminum.

Various characteristics, advantages, embodiments, and/or examples relating to the invention have been described in the foregoing description with reference to the accompanying drawings. However, the above description and drawings are illustrative only. The invention is not limited to the illustrated embodiments and/or examples, and all embodiments and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described embodiments and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or sample claim limitation should not be interpreted to invoke 35 U.S.C. § 112(f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

I claim:

1. An automotive brake system, comprising:
    a plurality of brake pads, each brake pad having an inner pad radius equal to or greater than an inner rotor radius of a brake rotor of a vehicle and an outer pad radius greater than the inner pad radius and equal to or less than the outer rotor radius of the brake rotor such that the brake pad is configured to apply a vehicle-specific friction braking force against a portion of a sector of a surface of the brake rotor;
    a plurality of pistons, each piston configured to apply a braking pressure to one of the brake pads sufficient to develop the vehicle-specific friction braking force; and
    a caliper, including:
        a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes:
            a first section defined by one or more first piston cavities and a first socket;
            a second section connected to the first section, the second section defined by one or more second piston cavities and a second socket;
            an internal crossover passage disposed partially within the first section and partially within the second section, the internal crossover passage configured to substantially contain a fluid between the first section and the second section, wherein the internal crossover passage is configured to vent at an internal pressure exceeding a vent pressure;
            wherein each of the first piston cavities and the second piston cavities are configured to receive a piston; and
            wherein the caliper body is configured to be attached to a stock knuckle of a vehicle;
        a first spring pin having a first end insertably disposed within the first socket;
        a second spring pin having a second end insertably disposed within the second socket; and
        wherein the first spring pin and the second spring pin are longitudinally collinear and configured to receive a slide groove of the brake pad; and
    wherein the brake pads, the pistons, the caliper, the first spring pin, and the second spring pin are configured for operable installation on the stock knuckle and operable fit with the stock wheel after removing an existing brake caliper from the vehicle.

2. The automotive brake system of claim 1, further comprising a boss disposed on the caliper body, wherein the boss comprises an inlet connection in fluid communication with the internal crossover passage.

3. The automotive brake system of claim 1, wherein the first spring pin and the second spring pins are configured to form an interference fit with the first socket and the second socket, respectively.

4. The automotive brake system of claim 1, wherein the caliper body is configured to fit directly onto the stock knuckle of the vehicle via a bolted connection directly between the caliper body and the stock knuckle.

5. The automotive brake system of claim 1, wherein the caliper body comprises machined billet aluminum.

6. An automotive brake system, comprising:
    a plurality of brake pads, each brake pad having an inner pad radius equal to or greater than an inner rotor radius of a brake rotor of a vehicle and an outer pad radius greater than the inner pad radius and equal to or less than the outer rotor radius of the brake rotor such that the brake pad is configured to apply a vehicle-specific friction braking force against a portion of a sector of a surface of the brake rotor;
    a plurality of pistons, each piston configured to apply a braking pressure to one of the brake pads sufficient to develop the vehicle-specific friction braking force; and
    a caliper, including:
        a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes:
            a first section defined by one or more first piston cavities and a first socket;

a second section connected to the first section, the second section defined by one or more second piston cavities and a second socket;
wherein each of the first piston cavities and the second piston cavities are configured to receive a piston; and
wherein the caliper body is configured to be attached to a stock knuckle of a vehicle;
a first spring pin having a first end insertably disposed within the first socket;
a second spring pin having a second end insertably disposed within the second socket; and
wherein the first spring pin and the second spring pin are longitudinally collinear and configured to receive a slide groove of the brake pad.

7. The automotive brake system of claim 6, wherein the brake pads, the pistons, the caliper, the first spring pin, and the second spring pin are configured for aftermarket installation on the vehicle by:
removing an existing brake caliper;
installing the caliper to the vehicle by attaching the caliper body to the stock knuckle; and
installing the stock wheel over the caliper body.

8. The automotive brake system of claim 6, wherein the caliper body further includes an internal crossover passage disposed partially within the first section and partially within the second section, the internal crossover passage configured to substantially contain a fluid between the first section and the second section, wherein the internal crossover passage is configured to vent at an internal pressure exceeding a vent pressure.

9. The automotive brake system of claim 8, further comprising a boss disposed on the caliper body, wherein the boss comprises an inlet connection in fluid communication with the internal crossover passage.

10. The automotive brake system of claim 6, wherein the first spring pin and the second spring pins are configured to form an interference fit with the first socket and the second socket, respectively.

11. The automotive brake system of claim 6, wherein the caliper body is configured to fit directly onto the stock knuckle of the vehicle via a bolted connection directly between the caliper body and the stock knuckle.

12. The automotive brake system of claim 6, wherein the caliper body comprises billet aluminum.

13. A method of making an automotive brake system, the method comprising:
receiving braking parameters for a vehicle, the braking parameters including an inner rotor radius of a brake rotor of the vehicle, an outer rotor radius of the brake rotor, and a vehicle-specific friction braking force;
generating brake pad design parameters for a brake pad, each brake pad having an inner pad radius equal to or greater than the inner rotor radius and an outer pad radius greater than the inner pad radius and equal to or less than the outer rotor radius such that the brake pad is configured to apply the friction braking force against a portion of a sector of a surface of the brake rotor;
generating piston design parameters for a piston, the piston configured to apply a braking pressure to the brake pad sufficient to develop the vehicle-specific friction braking force;
generating caliper design parameters for a caliper, the caliper including:
a caliper body defined by an inner caliper body radius and an outer caliper body radius, wherein the inner caliper body radius is equal to or greater than the inner rotor radius and the outer caliper body radius is greater than the inner caliper body radius and less than an inner radius of a stock wheel of the vehicle, wherein the caliper body includes:
a first section defined by one or more first piston cavities and a first socket;
a second section connected to the first section, the second section defined by one or more second piston cavities and a second socket;
wherein each of the first piston cavities and the second piston cavities are configured to receive a piston; and
wherein the caliper body is configured to be attached to a stock knuckle of a vehicle;
a first spring pin having a first end insertably disposed within the first socket;
a second spring pin having a second end insertably disposed within the second socket; and
wherein the first spring pin and the second spring pin are longitudinally collinear and configured to receive a slide groove of the brake pad; and
wherein the brake pads, the pistons, the caliper, the first spring pin, and the second spring pin are configured for operable installation on the stock knuckle and operable fit with the stock wheel after removing an existing brake caliper from the vehicle.

14. The method of claim 13, wherein the caliper body further includes an internal crossover passage disposed partially within the first section and partially within the second section, the internal crossover passage configured to substantially contain a fluid between the first section and the second section, wherein the internal crossover passage is configured to vent at an internal pressure exceeding a vent pressure.

15. The method of claim 14, further comprising a boss disposed on the caliper body, wherein the boss comprises an inlet connection in fluid communication with the internal crossover passage.

16. The method of claim 13, wherein the first spring pin and the second spring pins are configured to form an interference fit with the first socket and the second socket, respectively.

17. The method of claim 13, wherein the caliper body is configured to fit directly onto the stock knuckle of the vehicle via a bolted connection directly between the caliper body and the stock knuckle.

18. The method of claim 13, wherein the caliper design parameters are configured for the caliper to be machined from billet aluminum.

* * * * *